United States Patent [19]

Earp

[11] 4,096,363
[45] Jun. 20, 1978

[54] TRANSMISSION NETWORK INCLUDING FLUX COMPENSATION

[75] Inventor: Ronald Lee Earp, Burlington, N.C.

[73] Assignee: Bell Telephone Laboratories, Incorporated, Murray Hill, N.J.

[21] Appl. No.: 800,047

[22] Filed: May 24, 1977

[51] Int. Cl.² .................. H04Q 1/28; H04B 15/00
[52] U.S. Cl. ..................... 179/170 R; 179/18 FA; 323/6
[58] Field of Search ........... 179/170 R, 18 FA, 16 A, 179/16 AA, 16 F, 18 F, 81 A, 170 T, 70, 170 H; 330/195; 333/11; 336/170, 171, 182, 220; 323/6 R, 44 R

[56] References Cited

U.S. PATENT DOCUMENTS

| | | | |
|---|---|---|---|
| 1,809,879 | 6/1931 | Whittle | 330/195 |
| 3,299,384 | 1/1967 | Lee | 336/171 |
| 3,384,810 | 5/1968 | Kelsey | 323/48 |
| 3,410,961 | 11/1968 | Slana | 179/18 FA |
| 3,504,127 | 3/1970 | Slana | 179/16 F |
| 3,665,125 | 5/1972 | Valbonesi | 179/170 R |
| 3,818,338 | 6/1974 | Chambers, Jr. et al. | 323/6 |
| 3,881,149 | 4/1975 | Kiko | 323/44 R |
| 4,046,967 | 9/1977 | O'Neill | 179/18 FA |
| 4,046,968 | 9/1977 | Embree et al. | 179/18 FA |
| 4,064,449 | 12/1977 | Macrander | 179/18 FA |

Primary Examiner—William C. Cooper
Assistant Examiner—Randall P. Myers
Attorney, Agent, or Firm—Thomas Stafford

[57] ABSTRACT

Magnetic flux generated in a core of a transformer employed in a transmission network by subscriber loop direct current is compensated by controllably generating a current to induce a magnetic flux equal and oppositely phased to that induced by the loop current. This is achieved without need for an additional transformer winding other than the normal coupling windings by employing a current sensing element in circuit with the normal primary transformer winding which is effectively electrically isolated from a controllable current source connected in circuit with the normal secondary winding. The magnitude of the compensation current supplied to the secondary winding is controlled via the primary current sensing element. Negative feedback enhances the stability and linearity over a desired current range. Isolation between the primary and secondary circuits is realized by employing optical isolators, each including a light emitting diode and associated phototransistor.

6 Claims, 1 Drawing Figure

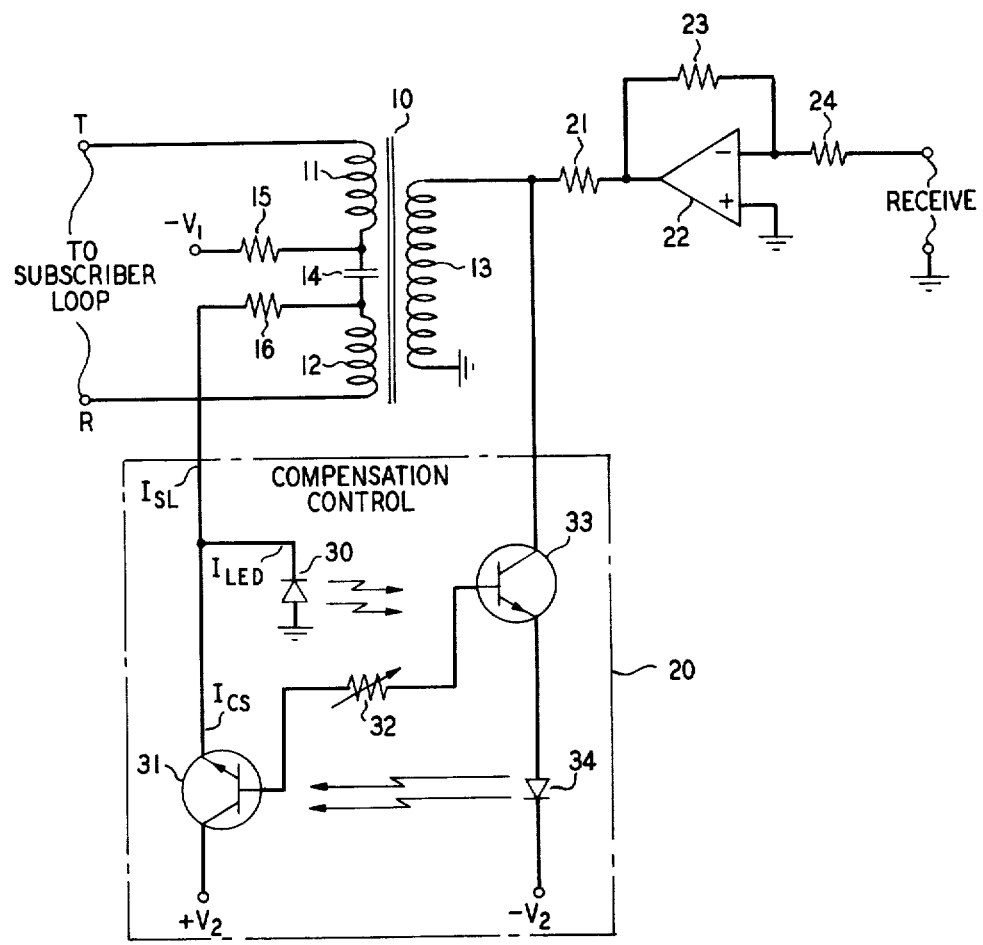

TRANSMISSION NETWORK INCLUDING FLUX COMPENSATION

BACKGROUND OF THE INVENTION

This invention relates to transmission networks and, more particularly, to networks for coupling transmission paths of a type including a transformer.

In transmission networks it is customary to couple a 2-wire path, for example, a subscriber loop, to another 2-wire path or to a 4-wire path via a coupling transformer or a hybrid transformer. It is also customary to provide direct current to the subscriber loop via windings of the transformer. Consequently, the direct current flowing the subscriber loop and, hence, the transformer windings, induces a magnetic flux which tends to saturate the transformer core. As is known, such saturation results in unwanted distortion of alternating current signals, for example, voice being transmitted over the network.

One way of minimizing the affect of the subscriber loop direct current is to employ a transformer having air gaps or a large core. These solutions, however, are undesirable because of the resulting increase in size of the transformer core and, hence, the transformer. The larger transformers are especially undesirable in most circuits in which the transformer is the largest component thereby dictating circuit package dimensions. Use of larger transformers requires more space and, consequently, reduces packaging density which increases costs.

One attempt at eliminating the need to use larger transformer cores and/or air gaps is disclosed in U.S. Pat. No. 3,665,125, issued May 23, 1972. In the disclosed arrangement an additional winding is employed in conjunction with a control transistor to generate a magnetic flux in the core to cancel the flux generated by the direct current flowing in the normal primary windings of the transformer. One notable problem with this prior arrangement is that use of an additional winding necessarily increases both the size and cost of the transformer. Indeed, in most applications the number of turns of the additional winding is equal to the turns of the primary windings. Additionally, this prior flux compensation arrangement is limited to the use of an additional winding to maintain isolation between the primary and secondary windings of the transformer.

SUMMARY OF THE INVENTION

These and other problems of the prior flux compensation arrangement are overcome in accordance with the principles of the invention to be described herein in a transformer coupling network including magnetic flux compensation.

Magnetic flux developed in a core of a transformer including at least primary and secondary windings for coupling signals from a first transmission path to a second transmission path, respectively, is compensated by employing a current sensing element in circuit with the primary winding in conjunction with a controllable current source in circuit with the secondary winding. The magnitude of direct current flowing in the primary winding is detected. Then, the current source is adjusted to supply a compensation current to the secondary winding having sufficient magnitude and being oppositely phased to the direct current flowing in the primary winding to cancel effectively the magnetic flux generated by the primary direct current.

Isolation between the primary and secondary windings is maintained by employing a radiant energy emitting element, for example, a light emitting diode, as the primary current sensing element and an associated radiant energy responsive element, for example, a phototransistor, for the compensation current source.

Stability and linearity over the dynamic current range of the compensation circuit is enhanced by employing a negative feedback arrangement to control the direct current flowing through the primary current sensing element in a prescribed relationship to the compensation direct current being supplied to the secondary winding. In one embodiment of the invention, a representation of the magnitude of the compensation current is employed to vary in a prescribed inverse relationship the current flowing through the primary sensing element. Isolation between the compensation current source and the primary circuit is realized by employing a radiant energy emitting element, for example, a light emitting diode, to sense the compensation current sensing element and an associated radiant energy responsive element, for example, a phototransistor, to control the current flowing through the primary sensing element.

BRIEF DESCRIPTION OF THE DRAWING

These and other objects and advantages of the invention will be more fully understood from the following detailed description of an illustrative embodiment taken in connection with the appended drawing which depicts a circuit arrangement illustrating one embodiment of the invention.

DETAILED DESCRIPTION

The figure illustrates a transmission network including transformer flux compensation in accordance with the invention which may be advantageously employed, for example, in a 2-wire to 4-wire telephone transmission network. Accordingly, shown is transformer 10 including first and second primary windings 11 and 12, respectively, and at least secondary winding 13. Transformer 10 may be a 2-to-4 wire hybrid transformer of a type now well known in the art. Such transformers include an additional secondary winding which has been excluded here. It is to be understood, however, that the instant invention is not limited to use only with hybrid transformers but may be equally used with other types of transformers, for example, ordinary one-to-one coupling transformers and the like.

One terminal of primary winding 11 is adapted to be connected to the tip (T) lead of a 2-wire subscriber loop while one terminal of primary winding 12 is adapted to be connected to the ring (R) lead of the subscriber loop. A second terminal of winding 11 is connected to one terminal of capacitor 14 and to one terminal of resistor 15. Similarly, a second terminal of winding 12 is connected to a second terminal of capacitor 14 and a second terminal of resistor 15. Capacitor 14 is the usual midpoint capacitor employed to bypass alternating current signals around the battery feed circuit. A typical value for this capacitor is 2.15 microfarads. Potential source $-V_1$ is connected to a second terminal of resistor 15 and is the typical office battery, for example, 48 volts, employed for supplying current to the subscriber loop. A second terminal of resistor 16 is connected to one terminal of compensation control 20. Resistors 15 and 16 are the usual battery feed resistors and are typically 200 ohms.

For purposes of illustration, secondary winding 13 is shown as being connected to a receive path of a 4-wire transmission network. As indicated above, the instant invention is not to be construed as being limited to this particular use. Thus, one terminal of secondary winding 13 is connected to a reference potential point, for example, ground potential, while a second terminal is connected to one terminal of resistor 21 and to a second terminal of compensation control circuit 20. A second terminal of resistor 21 is connected to an output terminal of amplifier 22. Amplifier 22 in conjunction with resistors 23 and 24 forms an inverting amplifier of a type now common in the art. As will be apparent to those skilled in the art, the output impedance of amplifier 22 is extremely low, being approximately zero. Consequently, resistor 21 effectively terminates secondary winding 13 and has a resistance value to match substantially the impedance developed across winding 13. A typical value for resistor 21 would be 600 ohms.

The primary and secondary circuit arrangements shown, except for compensation control circuit 20, are essentially identical to 2-to-4 wire transmission networks presently employed in telephone systems. Indeed, resistors 15 and 16, capacitor 14, and potential source $-V_1$ are a typical battery feed arrangement where capacitor 14 is employed to bypass audio frequency signals.

Compensation control circuit 20 is employed in this embodiment of the invention to sense direct current flowing in the subscriber loop and, hence, in primary windings 11 and 12, and to generate a corresponding direct current to be applied to secondary winding 13. As indicated above, direct current flowing in the subscriber loop also flows in windings 11 and 12 thereby causing a magnetic flux to be generated which tends to saturate the core of transformer 10.

Compensation control circuit 20 is employed in accordance with the principles of the invention for dynamically generating a direct current which is applied to winding 13 to generate a magnetic flux having a magnitude and phase to cancel substantially the flux caused by the direct current flowing in windings 11 and 12. To this end, a radiant energy emitting element, for example, light emitting diode (LED) 30, is connected between the second terminal of resistor 16 and a reference potential point, for example, ground potential. LED 30 is poled to pass current flowing in a direction from ground to resistor 16, i.e., the normal current flow direction in the subscriber loop. LED 30 is employed to sense or detect the magnitude of current flowing in the subscriber loop and emit a corresponding radiant energy level, i.e., light, representative of the magnitude of subscriber loop current. Also connected to the second terminal of resistor 16 is the emitter terminal of phototransistor 31. The collector terminal of phototransistor 31 is connected to potential source $+V_2$ while the base terminal of phototransistor 31 is connected via bias resistor 32 to the base terminal of phototransistor 33. Phototransistor 31 is a radiant energy responsive element employed effectively to realize a controllable current source for controlling the current flow through LED 30 in prescribed relationship to the compensation magnetic flux required. Operation of phototransistor 31 will be discussed below. In this example, phototransistor 31 is an N-P-N type and may include a Darlington pair to increase isolation between the primary and secondary circuits.

Phototransistor 33 is also a radiant energy responsive element which is employed as a controllable current source. In this example, phototransistor 33 is also an N-P-N type and may include a Darlington pair further to increase isolation between the primary and secondary circuits. Therefore, the collector terminal of phototransistor 33 is connected to the junction between resistor 21 and the second terminal of secondary winding 13. As is well known and will be apparent to those skilled in the art, the collector circuit of phototransistor 33 presents a "high" impedance to the secondary circuit, i.e., the junction between resistor 21 and winding 13. This high impedance is in the order of several kilohms. Thus, since the primary current sensing element, namely LED 30, is effectively electrically isolated from phototransistor 33, and since phototransistor 33 presents a relatively high impedance to secondary winding 13 and resistor 21, there is effectively no loading of the alternating current paths by the compensation control circuit. The base terminal current flowing between phototransistors 31 and 33 is extremely low and is being ignored.

The emitter terminal of phototransistor 33 is connected in circuit with another radiant energy emitting element, for example, LED 34 which, in turn, is connected to potential $-V_2$. LED 34 is employed to sense or detect the magnitude of compensating current supplied to winding 13 by phototransistor 33. Radiant energy from LED 34 representative of the magnitude of the compensation current is supplied to control phototransistor 31.

In operation, resistor 32 is adjusted or otherwise set to a value so that the compensating direct current generated by phototransistor 33 is of sufficient magnitude to generate a magnetic flux via winding 13 in the core of transformer 10 having a magnitude equal to but phased oppositely to the flux generated by windings 11 and 12 in response to the subscriber loop current. Level setting resistor 32 in effect is employed to adjust the current generated by phototransistor 33 to be in a prescribed ratio to the current flowing in primary windings 11 and 12 in order to cancel effectively the magnetic flux developed in the core of transformer 10 in response to the subscriber loop current. In some applications, transformer 10 may be employed to realize impedance level transformations. Consequently, the compensation current supplied to winding 13 need not be equal to the subscriber loop current detected via LED 30. However, once the ratio of the primary current to the secondary current is established it becomes desirable to maintain that ratio over some dynamic current range. It has been determined that a nominal loop current is on the order of 50 milliamperes but depending on the length of the particular subscriber loop connected to the transmission network the loop current may range from approximately 20 milliamperes for a very long loop to approximately 65 milliamperes for a very short loop. Thus, different values for resistor 32 are employed depending on the length of the particular loop initially attached to transformer 10. Any of numerous variable or adjustable resistors for bias purposes may be equally employed for this purpose. In specific applications it may be desirable merely to employ a compromise fixed value for resistor 32 which, for example, adjusts the compensating current level to be some nominal value corresponding to a subscriber loop of nominal length. However, it is to be recognized that in such applications there will be some degradation in operation when the loop length is less than or more than this nominal value. Additionally, in certain applications the transmission network will be connected to a subscriber loop which services a PBX. Consequently, the overall loop length may vary depending on the particular extension that the PBX is addressing. Indeed, in switching from one extension to another the overall subscriber loop length will vary. Therefore, the dynamic operating range of compensation control circuit 20 should be from a predetermined minimum current level, for example, 20 milliamperes, to a predetermined maximum value, for example, 65 milliamperes. In such a situation resistor 32 most likely would be adjusted to compensate for the subscriber loop to the PBX. Then, as different extensions and, hence, different loop lengths are connected via the PBX, the negative feedback arrangement of compensation control circuit 20 effectively adjusts the compensating current supplied to winding 13 to match the subscriber loop current sensed via LED 30.

To this end, the magnitude of the compensation current generated by phototransistor 33 is detected by LED 34 which emits light representative of a corresponding current level. Phototransistor 31 responds to the representative light from LED 34 to adjust the current supplied to LED 30. Current flowing through LED 30 may be expressed $$I_{LED} = I_{SL} - I_{CS} \quad (1)$$

where $I_{LED}$ is current flowing through LED 30, $I_{SL}$ is the subscriber loop current, and $I_{CS}$ is the current supplied by phototransistor 31. It is seen from equation 1 that as $I_{CS}$ is varied, $I_{LED}$ also varies in inverse relationship. Thus, in effect, LED 30, phototransistor 33, LED 34 and phototransistor 31 form a closed loop negative feedback circuit to enhance stability and linearity over the dynamic operating range of compensation control circuit 20.

It should be noted that the bandpass, i.e., frequency response of the optical isolators, is relatively low in frequency. Therefore, compensation control circuit 20 responds slowly to changes in subscriber loop length, i.e., direct loop current, but does not respond to voice frequency signals because of its "slow" response. Additionally, where improved response, i.e., slower and greater isolation between primary and secondary circuits, is desired, a bias arrangement may be employed which eliminates resistor 32. Specifically, a parallel connection of a capacitor (not shown) and a resistor (not shown) is connected between the collector and base terminals of phototransistor 31 and a resistor (not shown) is connected from the base terminal of phototransistor 31 to ground. First and second resistors (not shown) are connected between the base terminal of phototransistor 33 and ground and potential $-V_2$, respectively. Values for these components are selected to obtain a desired frequency response and initial loop current in a manner which will be apparent to those skilled in the art. Accordingly, resistor 32 is eliminated and greater isolation is obtained between the primary and secondary circuits.

The above-described arrangement is, of course, merely illustrative of the application of the principles of this invention. Numerous other arrangements may be devised by those skilled in the art without departing from the spirit and scope of the invention.

What is claimed is:

1. A transmission network which comprises:
   transformer means including a core and at least a primary winding and a secondary winding for coupling alternating current signals from a first transmission path to a second transmission path;
   first current sensing means in circuit with said primary winding for generating a first representation of the magnitude of a direct current flowing in said first transmission path;
   first controllable current source means in circuit with said second winding of said transformer means and being responsive to said first representation for supplying a compensation direct current of predetermined polarity to said second winding having a magnitude to cancel effectively a magnetic flux generated in said core because of the direct current flowing in said primary winding; and
   feedback means responsive to said compensation current for controlling the current flowing through said first current sensing means in accordance with a prescribed relationship.

2. A transmission network as defined in claim 1 wherein said feedback means includes second current sensing means in circuit with said first controllable current source means for detecting the magnitude of said compensation current and yielding a second representation of the magnitude of said compensation current and second controllable current source means in circuit with said first current sensing means and being responsive to said second representation for controlling direct current flowing through said first current sensing means in accordance with said prescribed relationship.

3. A transmission network as defined in claim 2 further including means in circuit with said first controllable current source means and said second controllable current source means for adjusting the compensation current magnitude to be in a prescribed ratio to the primary current.

4. A transmission network as defined in claim 2 wherein said second current sensing means includes radiant energy emitting means and wherein said second controllable current source means includes radiant energy responsive means.

5. A transmission network as defined in claim 4 wherein said first current sensing means includes a first light emitting diode and said first controllable current source means includes a first phototransistor, wherein said first light emitting diode and said first phototransistor are in predetermined spatial relationship forming an optical isolator.

6. A transmission network as defined in claim 5 wherein said second current sensing means includes a second light emitting diode and wherein said second controllable current source means includes a second phototransistor, wherein said light emitting diode and said phototransistor are in predetermined spatial relationship to form an optical isolator.

* * * * *